United States Patent
Zhang et al.

(10) Patent No.: US 11,570,079 B2
(45) Date of Patent: Jan. 31, 2023

(54) QUALITY-OF-SERVICE IN CELLULAR INFORMATION CENTRIC NETWORK

(71) Applicant: Intel Corporation, Santa Clara, CA (US)

(72) Inventors: Yi Zhang, Portland, OR (US); Zongrui Ding, Portland, OR (US); S. M. Iftekharul Alam, Hillsboro, OR (US); Satish Chandra Jha, Hillsboro, OR (US); Gabriel Arrobo Vidal, Hillsboro, OR (US); Kuilin Clark Chen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/246,243

(22) Filed: Apr. 30, 2021

(65) Prior Publication Data

US 2022/0094620 A1     Mar. 24, 2022

Related U.S. Application Data

(63) Continuation of application No. 16/457,435, filed on Jun. 28, 2019, now Pat. No. 11,025,520.

(51) Int. Cl.
*H04L 43/0894* (2022.01)
*H04W 24/08* (2009.01)
*H04L 41/5009* (2022.01)

(52) U.S. Cl.
CPC ...... *H04L 43/0894* (2013.01); *H04L 41/5009* (2013.01); *H04W 24/08* (2013.01)

(58) Field of Classification Search
CPC ... H04L 41/5009; H04L 43/028; H04L 43/08; H04L 43/0894; H04W 24/08
See application file for complete search history.

(56) References Cited

U.S. PATENT DOCUMENTS 8,509,193 B2   8/2013   Hassan et al.
8,635,450 B2   1/2014   Elgebaly et al.
(Continued)

FOREIGN PATENT DOCUMENTS

| CN | 109952773 A | * | 6/2019 | ........ H04W 28/0268 |
| CN | 110235463 A | * | 9/2019 | ............ H04W 28/02 |
| WO | 2018202205 | | 11/2018 | |

OTHER PUBLICATIONS

Hsu et al. Reflecting QoS Using SDAP Header Processing AS/NAS and Ensure the Re-mapping During Sequential Transmission Packet in a 5G Communication System. China Patent Document No. 109952773 A, translated by Clarivate Analytics. China, Jun. 28, 2019. (Year: 2019).*

(Continued)

*Primary Examiner* — Thomas R Cairns
(74) *Attorney, Agent, or Firm* — Hanley, Flight, Zimmerman, LLC (57) ABSTRACT

Systems and techniques for quality-of-service (QoS) in cellular information centric network (ICN) are described herein. An example system includes processing circuitry, and a memory that includes instructions, the instructions, when executed by the processing circuitry, cause the processing circuitry to obtain QoS characteristics for an ICN packet, apply the QoS characteristics to the ICN packet, and transmit the ICN packet over the cellular ICN in accordance with the QoS characteristics.

20 Claims, 5 Drawing Sheets

(56) References Cited

U.S. PATENT DOCUMENTS

| | | | |
|---|---|---|---|
| 9,736,762 | B2 | 8/2017 | Sirotkin et al. |
| 10,178,646 | B2 | 1/2019 | Bosch et al. |
| 10,432,509 | B2 * | 10/2019 | Oran .................. H04L 67/63 |
| 10,462,039 | B2 | 10/2019 | Wood et al. |
| 11,025,520 | B2 | 6/2021 | Zhang et al. |
| 2014/0207928 | A1 | 7/2014 | Mesnier et al. |
| 2015/0215840 | A1 | 7/2015 | Yu et al. |
| 2016/0173410 | A1 * | 6/2016 | Lopez .................. H04L 47/805 370/230 |
| 2017/0064028 | A1 | 3/2017 | Westphal et al. |
| 2017/0105227 | A1 | 4/2017 | Pinheiro et al. |
| 2018/0091410 | A1 | 3/2018 | Browne et al. |
| 2018/0176886 | A1 | 6/2018 | Kodaypak et al. |
| 2018/0324631 | A1 | 11/2018 | Jheng et al. |
| 2019/0028920 | A1 | 1/2019 | Pan |
| 2019/0150023 | A1 | 5/2019 | Cho et al. |
| 2019/0394109 | A1 | 12/2019 | Zhang et al. |
| 2020/0112907 | A1 | 4/2020 | Dao et al. |
| 2020/0162582 | A1 * | 5/2020 | McCarthy ............... H04L 67/63 |

OTHER PUBLICATIONS

Li et al. Method in a Wireless Communication System for Executing Reflects the Quality of Service (QoS) and Device Thereof. China Patent Document No. 110235463 A, translated by Clarivate Analytics. China, Sep. 13, 2019. (Year: 2019).*
3GPP; TSG RAN; LTE; Evolved Universal Terrestrial Radio Access (E-UTRA) and Evolved Universal Terrestrial Radio Access Network (E-UTRAN); Overall description; Stage 2 (Release 13), 3GPP TS 36.300 V13.2.0, (Jan. 13, 2016), 299 pages.
5G; Procedures for the 5G System, 3GPP TS 23.502 version 15.2.0 Release 15, ETSI TS 123 502 V15.2.0, Jun. 2018), 311 pages.
Information-Centric Networking (icnrg), https://datatracker.ietf.org/group/icnrg/about/, accessed on Jun. 20, 2019, 5 pages.
5G; NR; Overall description; Stage-2, ETSI TS 138 300 V15.3.1, 3GPP TS 38.300 version 15.3.1 Release 15, Oct. 2018, 90 pages.
3GPP TS 23.501 V15.2.0, 3rd Generation Partnership Project;Technical Specification Group Services and System Aspects; System Architecture for the 5G System;Stage 2 (Release 15), Jun. 2018, 78 pages.
ETSI TS 138 331 V15.3 0 (Oct. 2018), 5G;NR;Radio Resource Control (RRC);Protocol specification (3GPP TS 38.331 version 15.3.0 Release 15), Oct. 2018, 441 pages.
ETSI TS 136 331 V13.0.0, LTE; Evolved Universal Terrestrial Radio Access (E-UTRA); Radio Resource Control (RRC); Protocol specification (3GPP TS 36.331 version 13 0.0 Release 13), Jan. 2016, 670 pages.
Ravindran, R., et al. "Enabling ICN in 3GPP's 5G NextGen Core Architecture", Memo ICNRG, Jul. 2, 2018), 26 pages.
Ravindran, et al., "5G-ICN: Delivering ICN Services over 5G Using Network Slicing", IEEE Communications Magazine, May 2017, 7 pages.
United States Patent and Trademark Office, "Notice of Allowance", issued in connection with U.S. Appl. No. 16/457,435, dated Feb. 3, 2021, (9 pages).
United States Patent and Trademark Office, "Non-Final Office Action", issued in connection with U.S. Appl. No. 16/457,435, dated Jul. 20, 2020, (20 pages).

* cited by examiner

QUALITY-OF-SERVICE IN CELLULAR INFORMATION CENTRIC NETWORK

RELATED APPLICATION

This patent arises from a continuation of U.S. patent application Ser. No. 16/457,435, (now U.S. Pat. No. 11,025,520) which was filed on Jun. 28, 2019. U.S. patent application Ser. No. 16/457,435 is hereby incorporated herein by reference in its entirety. Priority to U.S. patent application Ser. No. 16/457,435 is hereby claimed.

TECHNICAL FIELD

Embodiments described herein generally relate to computer networking and more specifically to quality-of-service (QoS) in a cellular information centric network (ICN).

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the reverse traces of the interest left in the network devices.

Cellular standards (e.g., as those promulgated by the Third Generation Partnership Project (3GPP) or the European Telecommunications Standards Institute (ETSI)) generally define not only the radio access network (RAN) but may also define several core network protocols as well. The core network refers to the communications between components within a cellular carrier's network to support voice and data to mobile devices.

In Long Term Evolution (LTE) (e.g., fourth generation or 4G) cellular networks, the concept of QoS is based on bearers. An LTE bearer is a transmission path through the infrastructure and radio interface with a defined capacity, latency, and packet loss. A bearer may be allocated dynamically or statically (e.g., subscription-based). Dynamic control of QoS can be triggered by application servers using a 3GPP Rx interface, for example.

A QoS Class Identifier (QCI) indicates the prioritization in scheduling and queuing of admitted flows. QCI can have values of 1-254. Each value is associated with three attributes: Priority, Packet delay budget, and Packet error loss. QCI values are used for selecting scheduling weights, queue thresholds, link-layer configuration and IP transport Differentiated Services Code Point (DSCP) mapping. QCI values 1-127 are reserved for standardization and 3GPP has already defined some of these. For example, QCI 9 is used for the best effort traffic. Many current commercial subscriber flows are classified for QCI 9. QCI 1 and QCI 5 can be used for commercial voice (e.g. VoLTE) flows and signaling. QCI values 128-254 are operator-specific and their attributes are provisioned into the network elements because the standard does not define a mechanism to propagate such information with control signaling.

Fifth generation cellular (e.g., 5G) standards have a flow based QoS concept. A QoS flow is the finest granularity for QoS management in 5G Core network (e.g., 5GC). Granularity for QoS treatment (e.g., per flow) is different from tunneling (e.g., per protocol data unit (PDU) session), and it will enable more flexible QoS control. The concept of bearers is absent from 5GC but 5G Radio Access Network (NG-RAN) still maintains the radio bearer concept. 5G QoS flows are mapped to Data Radio Bearers (DRBs) in the NG-RAN, unlike 4G where the mapping is 1:1 between EPC and radio bearers. Thus, a PDU session may contain multiple QoS flows and several DRBs but only a single N3 GTP-U tunnel. Packets are classified and marked with QoS Flow Identifier (QFI) and the value is unique in one PDU session.

Similar to QCI in 4G, a 5G QoS Indicator (5QI) is used in 5G to describe the packet forwarding treatment. 5QI uses five attributes: Priority, Packet delay budget and Packet error rate, maxi data burst volume, and averaging window. Because of the flow-based transmission, user equipment (UE) (e.g., a mobile phone or other device accessing the cellular network), RAN nodes, and user plane function (UPF) are aware of the QoS configuration for each QoS flow, which is spread and configured during a PDU session establishment procedure. Therefore, QFI is enough for the RAN to determine the QoS flow and QoS profile associated with the received packet. It, in turn, may be used to determine the mapping between DRB and QoS flow in RAN node. QFI is carried in an extension header on N3/N9 in the general packet radio service (GPRS) Tunneling Protocol (GTP) user data (GTP-U) protocol, using uplink (UL) and downlink (DL) PDU session information frames. QFI could be configured equal to 5QI.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The current 5G QoS architecture is changing but is still focused on transmission control protocol (TCP)/Internet protocol (IP) based data transmission. Although there are discussions to enable ICN in 5G via extension of the user plane or control plane, these discussions have largely not addressed QoS. Because there is no end-to-end PDU session established for ICN-based data delivery in 5G, a solution for QoS support in 5G ICN packet delivery, which integrates wells with the current 5G QoS architecture, is needed.

For the following discussion, some assumptions are made. For example, both UE and application servers may be content providers. Further, the application server may be located outside of an operator's network (e.g., outside of a cellular core network). Data delivery between an application server and UPF is not addressed. Rather, the following techniques and examples are directed to the ICN-based data delivery within the core network where each node is ICN capable. Although the examples use the 5G QoS architecture, the techniques may also be applicable to 4G networks.

The QoS in cellular ICN described herein extends existing control plane signaling (e.g., in the UPF) to support QoS rule configuration for ICN-based data delivery. This may include defining an ICN QoS Identifier for 4G/5G, mapping the ICN QoS Identifier to QoS characteristics, or differing network entity behaviors based on the ICN QoS Identifier or the mapping. By following these techniques, a solution to QoS handling for ICN packet delivery in a cellular network is provided that has a small impact to the existing 4G or 5G QoS architectures.

Figure 1:
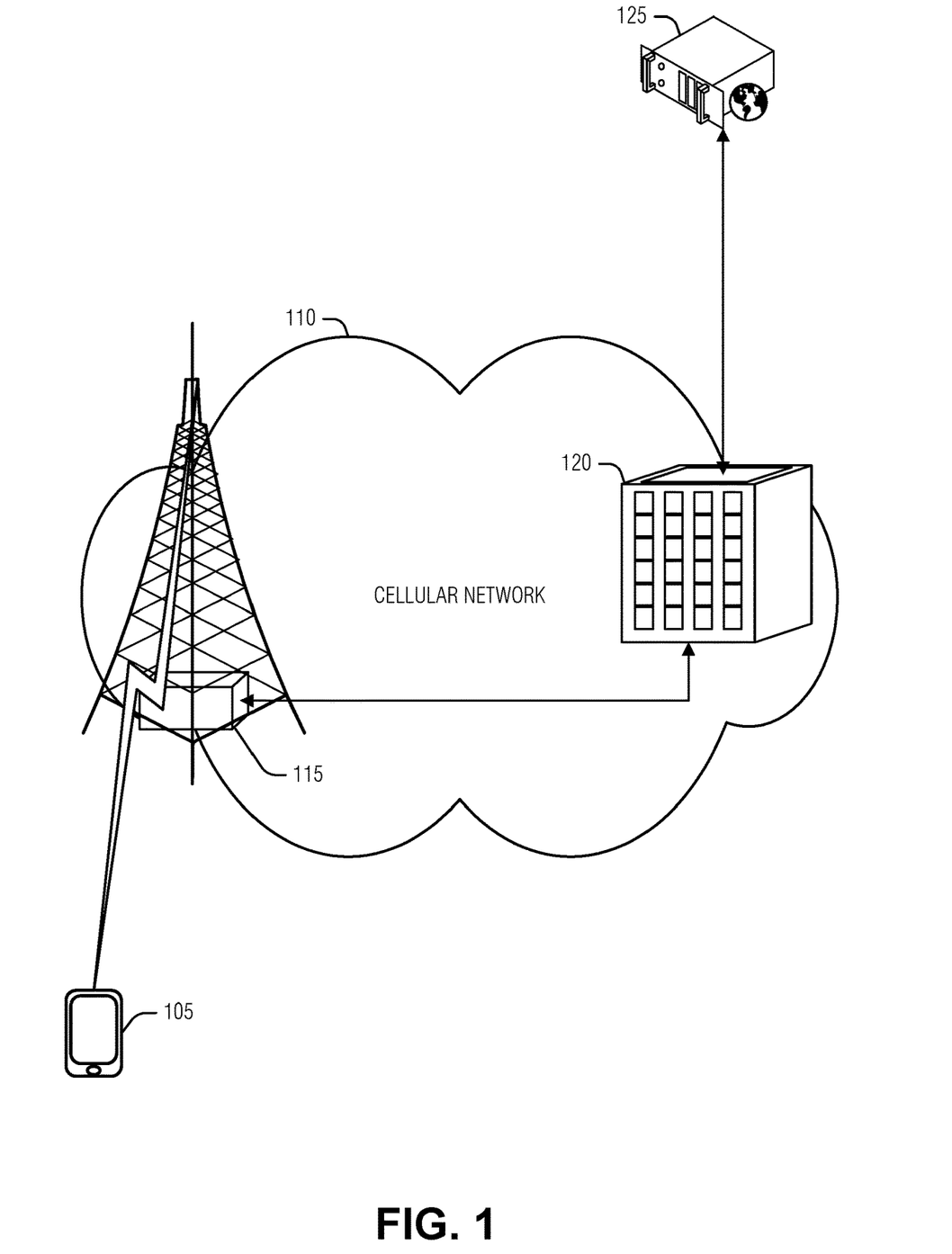
FIG. 1 is a block diagram of an example of an environment including a system for QoS in cellular ICN, according to an embodiment.

FIG. 1 is a block diagram of an example of an environment including a system for QoS in cellular ICN, according to an embodiment. As illustrated, a UE 105 is wirelessly connected to a base station 115 (e.g., enhanced node B (eNB)). The base station 115 is part of a radio access network that interfaces with the core network 110, which may also include other network entities 120. These other network entities 120 or the base station 115 may connect to an external application server 125 to, for example, provide textual, video, audio, or gaming content among other things. These entities are illustrated to provide an example context for the following discussion.

Generally ICN packets are independent from each other and each one may have different QoS requirements. Although each ICN packet may carry QoS information, this technique may introduce a significant overhead to the ICN packets. As noted above, QFI is an important parameter used by network nodes—such as the UE 105, UPF (e.g., in the network entities 120), and NG-RAN—for selecting scheduling weights, queue thresholds, link-layer configuration or IP transport Differentiated Services Code Point (DSCP) mapping. To leverage the QFI architecture for ICN, a QoS identifier, akin to QFI, is used for ICN-based data delivery in order to enable coexistence between TCP/IP and ICN and further smooth a migration to ICN. The ICN QoS Identifier is a mapping of ICN QoS characteristics.

In an example, the QoS Identifier for ICN extends the 5G 5QI to support ICN features. Here, unused values of 5QI are defined and new QoS characteristics are added to support ICN. In an example, the QoS Identifier for ICN does not extend 5QI, but rather is independent of the definitions for 5QI defined in 5G standards.

The ICN QoS Identifier is carried in each ICN packet and is used by a receiving node to determine how to forward the ICN packet. Characteristics provided by the QoS Identifier for ICN, which may directly impact the transmission characteristics of a node for the ICN packet may include one or more of the following: priority; whether it is an interest or data packet; packet delay budget due to communication type; packet error rate; maximum data burst volume; averaging window; computation capability; or packet delay budget due to computation.

Figure 2:
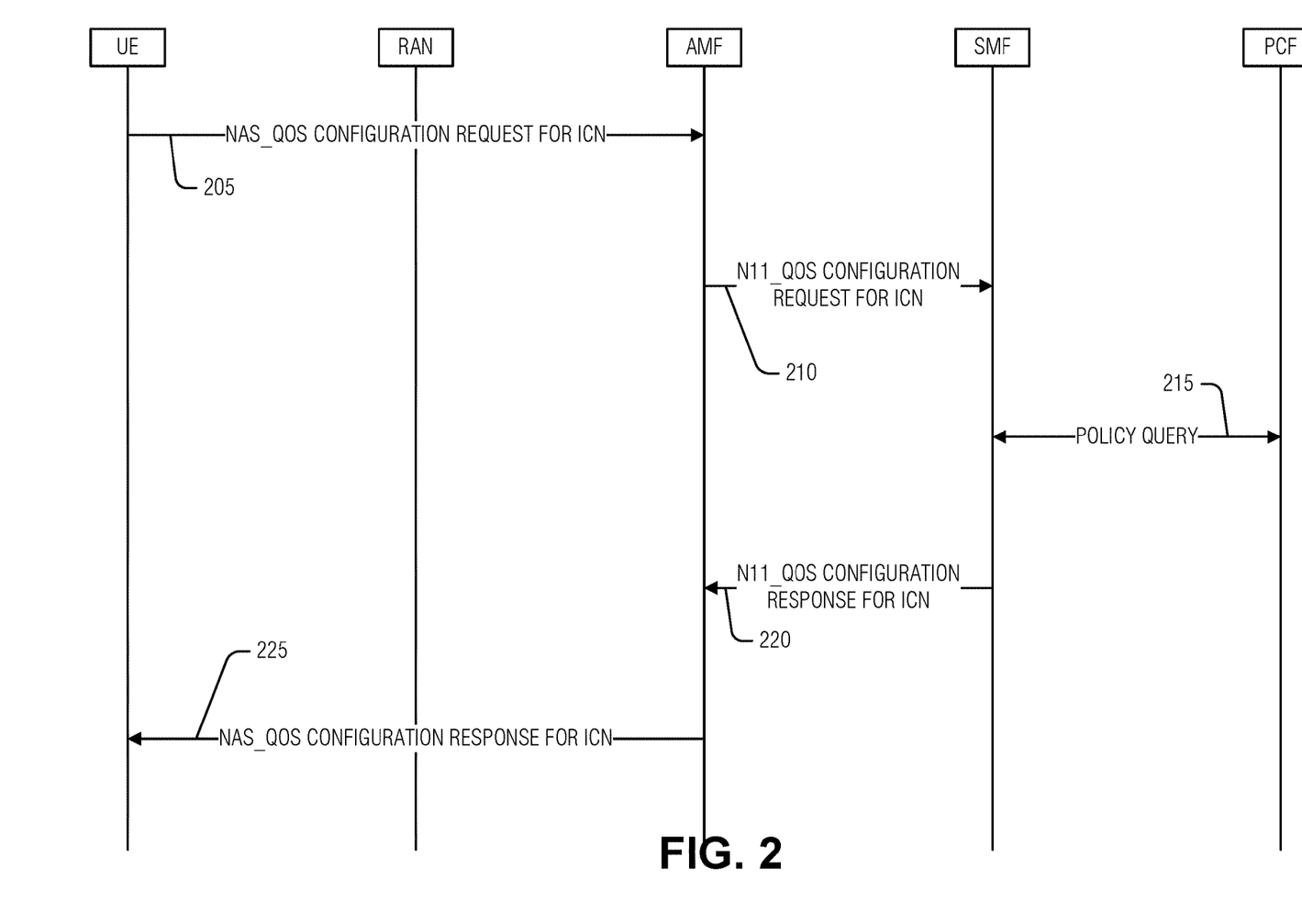
FIG. 2 is an example of a data flow between various network components, according to an embodiment.

RAN nodes (e.g., UE 105 or base station 115) and the intermediate routing nodes (e.g., other network entities 120) parse the ICN QoS Identifier field in ICN packets to retrieve the ICN QoS Identifier. The QoS Identifier for ICN is used to determine transmission characteristics to apply to the ICN packet. These transmission characteristics are then used to apply a forwarding scheme to the received ICN packet. In an example, a mapping table between an ICN QoS Identifier and ICN QoS characteristics is configured on RAN-Core nodes and the intermediate routing nodes. FIG. 2 illustrates an example of configuring control plane entities in the UPF for determining and applying the forwarding scheme.

The following are examples of techniques for a variety of network entities to implement the QoS Identifier for ICN. For example, with respect to the UE 105, the UE 105 may use packet filters in the QoS rules similar to non-access stratum (NAS) filters. Thus, the ICN packets traverse the ICN packet filters to be classified into different ICN QoS flows. Here, "flow" is used to define ICN packets with similar QoS characteristics, similar to its application in 5G standards. These may be considered virtual flows to distinguish from underlying 5G flows. Again, ICN packets in a single virtual flow receive the same QoS handling.

Also, with respect to the UE 105, an extension to the Service Data Adaptation Protocol (SDAP) defined in 3GPP—which is used to map the flows to (Data Radio Bearers) DRBs—may be made. Generally, unmodified, the SDAP layer puts QFI in the header of an SDAP Data PDU. Although SDAP functionalities may be kept unmodified, an extension may be used to support the ICN QoS Identifier in the header of SDAP Data PDU. A receiver may determine whether the PDU corresponds to an ICN packet or an IP packet based on the QoS Identifier format, value range, size, etc.

With respect to a RAN node, such as the base station 115, several techniques may be employed. For example, for UL data, the RAN node may remove the SDAP header and generate an ICN packet that contains the ICN QoS Identifier. For DL data, the RAN node may parse the ICN QoS Identifier carried in an ICN packet and use it to map the packet to the corresponding DRBs.

With respect to a UPF (e.g., as implemented in the other network entities 120), similar to the UE 105 details noted above, packets received from outside the core network 110 may be classified and marked with an ICN QoS Identifier after packet filters are applied and the UPF generates ICN packets which contain the ICN QoS Identifier.

Because ICN networks have two distinct types of packets, interest packets (e.g., interests) and data packets, QoS considerations regarding these packets may be complicated, such as whether QoS is reflective (e.g., the same for both interest and data packets) or whether it is specified differently for the two types of packets. In a reflective QoS arrangement, identical QoS requirements are applied to both interest and data packets. In an example, a data packet may use the same ICN QoS Identifier carried in the Interest packet. In an example, a reflective QoS Indicator field is carried in Interest packets to enable application of the ICN QoS Identifier without the need to carry the ICN QoS Identifier in the data packet. This may be accomplished by simply looking up the ICN QoS Identifier of the interest packet in the pending interest table when the data packet traverses the core network 110.

With differing QoS requirements for interest and data packets, a consumer (e.g., service or device rather than a human user) may specify the QoS characteristics of data packets being sent in response to an interest packet generated by the consumer. Thus, in an example, QoS requirements or requests for the data packets may be carried in the interest packet. Here, the content producer may map the QoS requirements or requests to the QoS Identifier. In an example, the consumer may map the QoS requirement for a data packet to a QoS Identifier and carry this QoS Identifier for the data packet in the corresponding interest packet. Here, the producer uses the included ICN QoS Identifier upon reception of the data packet. In an example, the producer specifies the QoS requirement for data packets.

FIG. 2 is an example of a data flow between various network components, according to an embodiment. The illustrated network components are a UE, the RAN (e.g., base station) and UPF. The UPF may include several control plane functions, such as the Policy Control Function (PCF), Session Management Function (SMF), and Access & Mobility Management Function (AMF), as illustrated in FIG. 2. As noted above, QoS characteristics (e.g., rules) may be signaled QoS rules—e.g., the rules are promulgated to the various entities via an explicit signaling mechanism. Alternatively, QoS rules may be derived QoS rules in which information within a received ICN packet drives the behavior of the receiving node.

The illustrated data flow is of signaled QoS characteristics. The network nodes—e.g., UE and UPFs—are nodes where ICN packets are generated. As these are signaled QoS nodes, they are configured with QoS rules before ICN packet delivery. To perform the configuration, the UE may generate a request for a NAS filter specific to ICN (message 205), to the AMF, for example. The AMF then requests the QoS configuration from the SMF via a 5G N11 interface (message 210). The SMF queries the PCF to get the actual QoS policy (exchange 215) and returns the result to the AMF (message 220). The AMF may then respond to the UE with the pertinent QoS characteristics (message 225).

The ICN characteristics may be specific to each node level, such that the UE and the RAN may treat the same packets differently. However, it is generally more useful if the packets are treated the same across the various network nodes. The ICN characteristics may include one or more of an ICN QoS Rule Identifier, and ICN QoS Identifier, or packet filters for ICN packets. In an example, the packet filters may accept an ICN packet type as a parameter to implement differing classifications for interest packets and data packets, for example.

Figure 3:
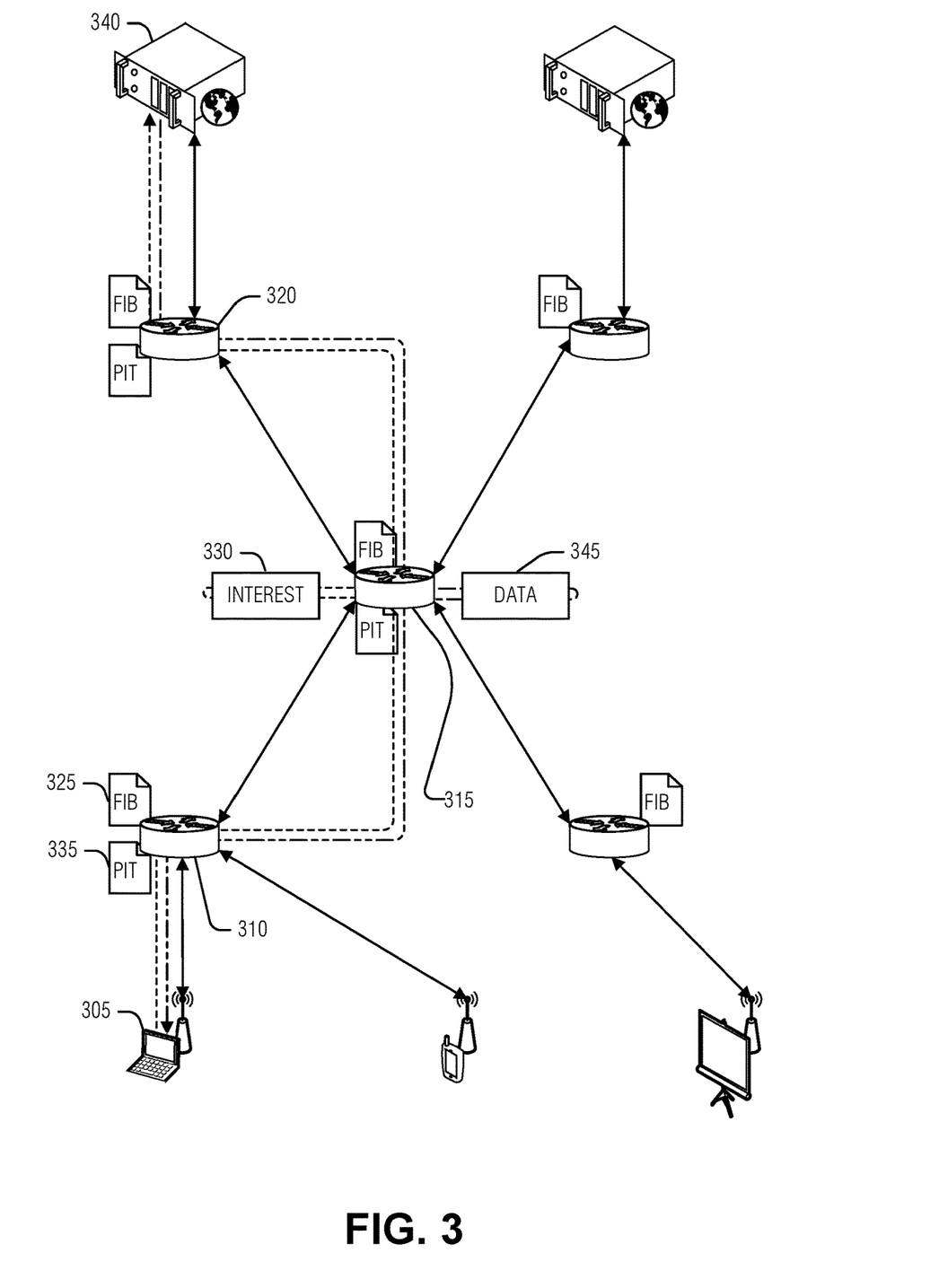
FIG. 3 illustrates an example ICN, according to an embodiment.
Figure 5:
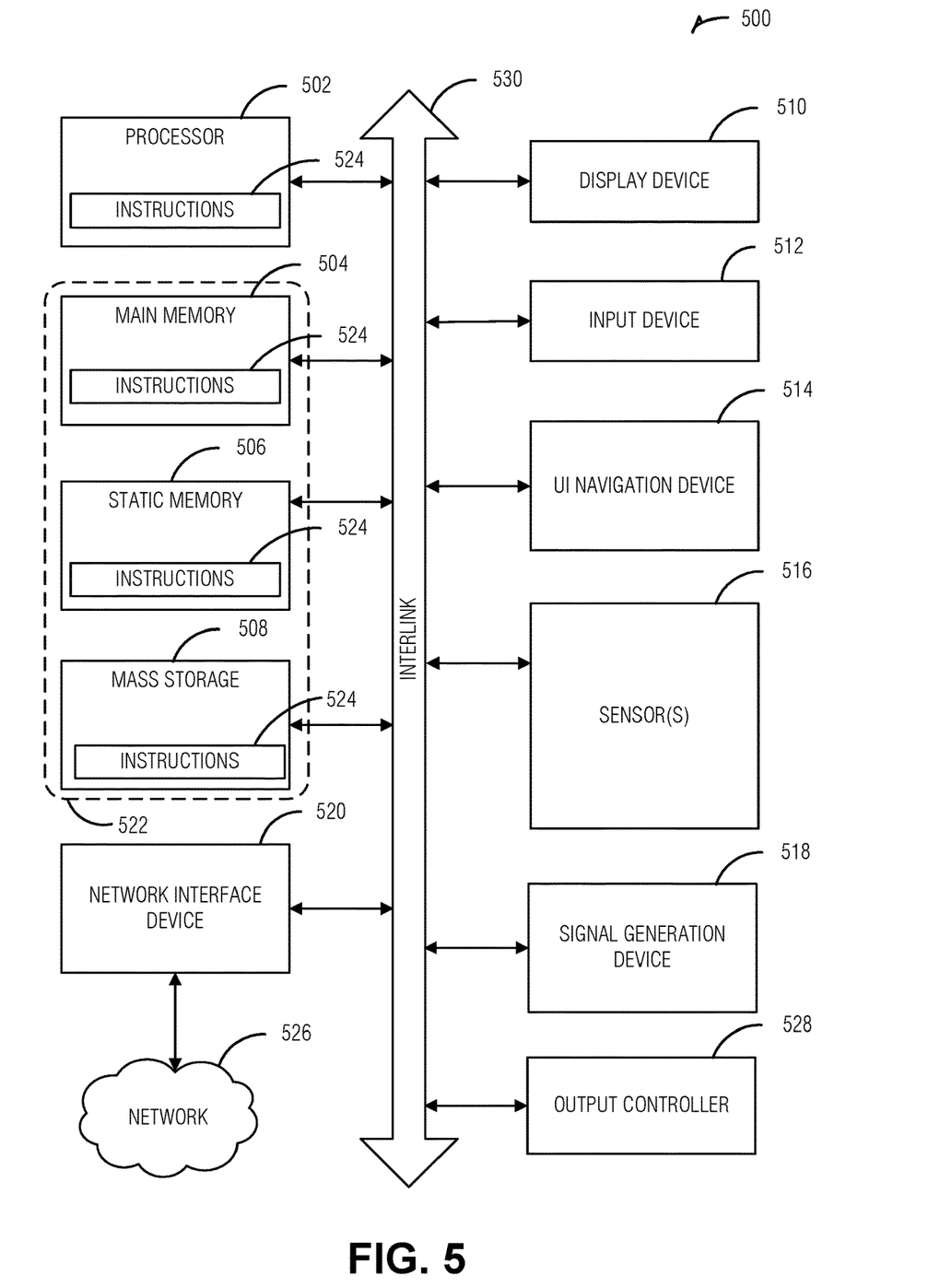
FIG. 5 is a block diagram illustrating an example of a machine upon which one or more embodiments may be implemented.

FIGS. 3 and 5 below provide additional details of the components in FIG. 1. For example, FIG. 3 illustrates several details and variations in ICNs. FIG. 5 illustrates several examples of computer hardware that can be used to implement any of the components illustrated in FIG. 1.

FIG. 3 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 305 (e.g., subscriber) requests named content from the network itself. The content request may be called an interest and transmitted via an interest packet 330. As the interest packet traverses network devices (e.g., network elements, routers, switches, hubs, etc.)—such as network elements 310, 315, and 320—a record of the interest is kept, for example, in a pending interest table (PIT) at each network element. Thus, network element 310 maintains an entry in its PIT 335 for the interest packet 330, network element 315 maintains the entry in its PIT, and network element 320 maintains the entry in its PIT.

When a device, such as publisher 340, that has content matching the name in the interest packet 330 is encountered, that device 340 may send a data packet 345 in response to the interest packet 330. Typically, the data packet 345 is tracked back through the network to the source (e.g., device 305) by following the traces of the interest packet 330 left in the network element PITs. Thus, the PIT 335 at each network element establishes a trail back to the subscriber 305 for the data packet 345 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 330 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 330 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 330 to data cached in the ICN element. Thus, for example, if the data 345 named in the interest 330 is cached in network element 315, then the network element 315 will return the data 345 to the subscriber 305 via the network element 310. However, if the data 345 is not cached at network element 315, the network element 315 routes the interest 330 on (e.g., to network element 320). To facilitate routing, the network elements may use a forwarding information base 325 (FIB) to match named data to an interface (e.g., physical port) for the route. Thus, the FIB 325 operates much like a routing table on a traditional network device.

In an example, additional meta-data may be attached to the interest packet 330, the cached data, or the route (e.g., in the FIB 325), to provide an additional level of matching. For example, the data name may be specified as "www.somedomain.com or videos or v8675309," but also include a version number—or timestamp, time range, endorsement, etc. In this example, the interest packet 330 may specify the desired name, the version number, or the version range. The matching may then locate routes or cached data matching the name and perform the additional comparison of meta-data or the like to arrive at an ultimate decision as to whether data or a route matches the interest packet 330 for respectively responding to the interest packet 330 with the data packet 345 or forwarding the interest packet 330.

ICN has advantages over host-based networking because the data segments are individually named. This enables aggressive caching throughout the network as a network element may provide a data packet 330 in response to an interest 330 as easily as an original author 340. Accordingly, it is less likely that the same segment of the network will transmit duplicates of the same data requested by different devices.

Fine grained encryption is another feature of many ICN networks. A typical data packet 345 includes a name for the data that matches the name in the interest packet 330. Further, the data packet 345 includes the requested data and may include additional information to filter similarly named data (e.g., by creation time, expiration time, version, etc.). To address malicious entities providing false information under the same name, the data packet 345 may also encrypt its contents with a publisher key or provide a cryptographic hash of the data and the name. Thus, knowing the key (e.g., from a certificate of an expected publisher 340) enables the recipient to ascertain whether the data is from that publisher 340. This technique also facilitates the aggressive caching of the data packets 345 throughout the network because each data packet 345 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information (NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

Figure 4:
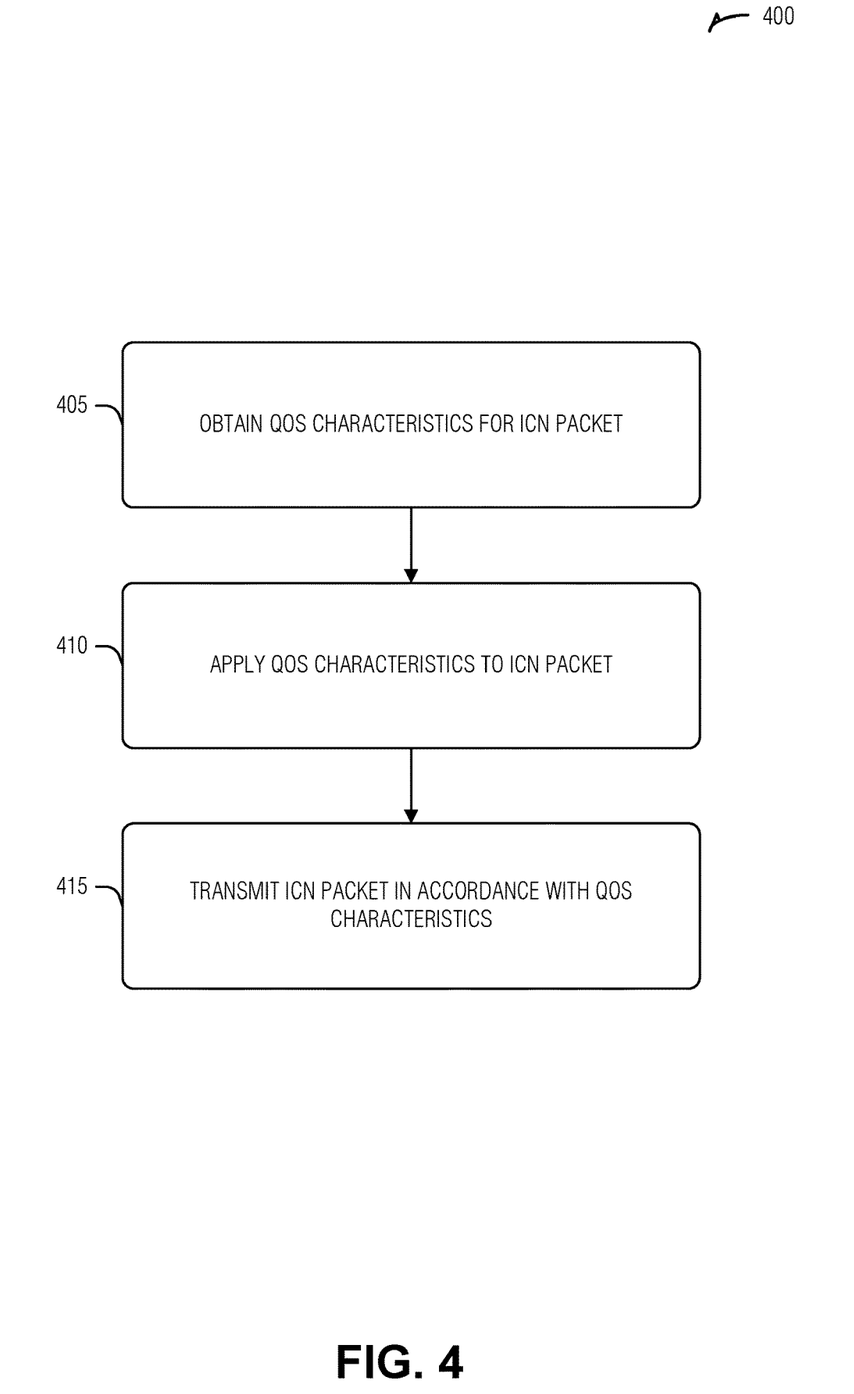
FIG. 4 is an example of a method for QoS in cellular ICN, according to an embodiment.

FIG. 4 is an example of a method 400 for QoS in cellular ICN, according to an embodiment. The operations of the method 400 are implemented in computing hardware, such as that described above in FIG. 1, 2, or 3, or below in FIG. 5 (e.g., processing circuitry).

At operation 405, QoS characteristics for an ICN packet are obtained. In an example, to obtain the QoS characteristics, a node reads the QoS characteristics from the ICN packet. As noted above, while possible, this example may lead to extensive overhead in ICN packets.

In an example, to obtain the QoS characteristics, a node may read an ICN QoS identifier from the ICN packet. Here, the ICN QoS identifier is a single valued field. This field may be used as an index into a codebook of QoS characteristics. Thus, the node, once having obtained the ICN QoS identifier, may retrieve (e.g., query) the QoS characteristics from a local data store using the ICN QoS identifier.

In an example, to obtain the QoS characteristics, a node may read a reflective tag from the ICN packet. Here, the ICN packet is a data packet. The reflective tag indicates that the QoS of the data packet is the same as the interest packet that provoked the data packet. The reflective tag may be a single bit, thus saving on ICN packet overhead when compared to the ICN QoS identifier. The reflective bit is effective in ICN networks due to the interest logged in the node's PIT. Thus, if the PIT entry for the interest includes the QoS identifier, or even the QoS characteristics, then the node may retrieve these values from the PIT when it encounters a reflective tag on a data packet. Accordingly, in an example, an interest corresponding to the data packet is located in the PIT, the ICN QoS identifier from the interest in the PIT, and the QoS characteristics from the local data store using the ICN QoS Identifier.

In an example, to obtain the QoS characteristics, a node may be configured via a control plane without regard to receipt of the ICN packet. Here, the configuration is not provided, or hinted at, in an ICN packet, as described above. Rather, the node receives a configuration (e.g., filters, classifications, operations, etc.) via control plane signaling. Then, when an ICN packet is encountered by the node, the configuration instructs the node on the proper course of action. In an example, being configured via the control plane includes requesting the QoS characteristics from the control plane and receiving the QoS characteristics in response. This is similar to the data flow illustrated in FIG. 2.

At operation 410, the QoS characteristics are applied to the ICN packet. Here, applying the QoS characteristics involves tagging, labeling, classifying, binning, or otherwise associating the QoS characteristics to the ICN packet. In an example, applying the QoS characteristics to the ICN packet includes separating traffic into logical units called flows. Here, each flow has respective transmission parameters based on the QoS characteristics. The ICN packet is classified into one of these flows for transmission. Flows may be though of as queues in which transmission of the elements from the queue have the same QoS characteristics.

In an example, classifying the ICN packet into the flow includes applying a filter to the ICN packet. The filter may key off of many aspects of the ICN packet to classify it into a flow. In an example, the filter classifies ICN packets based on an ICN QoS identifier and an ICN packet type. The use of such a filter is similar to NAS filters used in a 5G UE to map packets to a QoS flow.

At operation 415, the ICN packet in accordance with the QoS characteristics. Such a transmission entails meeting, to the extent possible, the QoS characteristics. Thus, if ICN packets with a certain classification have an average throughput per time period (e.g., window), then those packets may be prioritized over others if doing otherwise would cause packets with the certain classification to fall outside of the QoS specified throughput. In an example, the QoS characteristics are at least one of priority, ICN packet type, packet delay budget, packet error rate, maximum data burst volume, averaging window, computation capability, or packet delay imposed by computation.

In an example, the method 400 may be extended to address transitioning from 3GPP RAN to ICN. Thus, for example, the node may be arranged to receive a non-ICN packet from a radio bearer in a RAN interface (e.g., hardware or virtual port connected to a radio network), where the non-ICN packet includes QoS characteristics or a QoS identifier in a Service Data Adaption Protocol (SDAP) header, as defined in a family of 3GPP standards. The node may then create an ICN packet that includes the QoS characteristics or the QoS identifier.

Also, in an example, the node may parse the QoS characteristics or the QoS identifier from the ICN packet. Here, the ICN packet is destined (e.g., ultimately directed to) another node connected via the RAN. The node may then write the QoS characteristics or the QoS identifier to a SDAP header of a new non-ICN packet. The node may next transmit the new non-ICN packet via the RAN.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

ADDITIONAL NOTES & EXAMPLES

Example 1 is a system for quality-of-service (QoS) in a cellular information centric network (ICN), the system comprising: processing circuitry; and a memory that includes instructions, the instructions, when executed by the processing circuitry, cause the processing circuitry to: obtain QoS characteristics for an ICN packet; apply the QoS characteristics to the ICN packet; and transmit the ICN packet in accordance with the QoS characteristics.

In Example 2, the subject matter of Example 1, wherein, to obtain the QoS characteristics, the processing circuitry is configured via a control plane without regard to receipt of the ICN packet.

In Example 3, the subject matter of Example 2, wherein being configured via the control plane includes the processing circuitry to request the QoS characteristics from the control plane and to receive the QoS characteristics in response.

In Example 4, the subject matter of any of Examples 1-3, wherein obtaining the QoS characteristics includes reading the QoS characteristics from the ICN packet.

In Example 5, the subject matter of any of Examples 1-4, wherein, to obtain the QoS characteristics, the processing circuitry reads an ICN QoS identifier from the ICN packet and retrieves QoS characteristics from a local data store using the ICN QoS identifier.

In Example 6, the subject matter of any of Examples 1-5, wherein, to obtain the QoS characteristics, the processing circuitry is configured to: read a reflective tag from the ICN packet, wherein the ICN packet is a data packet; locate an interest corresponding to the data packet in a pending interest table (PIT); read an ICN QoS identifier from the interest in the PIT; and retrieve the QoS characteristics from a local data store using the ICN QoS Identifier.

In Example 7, the subject matter of any of Examples 1-6, wherein, to apply the QoS characteristics to the ICN packet, the processing circuitry is configured to: separate traffic into logical units called flows, each flow including respective transmission parameters based on the QoS characteristics; and classify the ICN packet into a flow for transmission.

In Example 8, the subject matter of Example 7, wherein, to classify the ICN packet into the flow, the processing circuitry is configured to apply a filter to the ICN packet.

In Example 9, the subject matter of Example 8, wherein the filter classifies ICN packets based on QoS rules.

In Example 10, the subject matter of any of Examples 1-9, wherein the QoS characteristics are at least one of priority, ICN packet type, packet delay budget, packet error rate, maximum data burst volume, averaging window, computation capability, or packet delay imposed by computation.

In Example 11, the subject matter of any of Examples 1-10, wherein the instructions further cause the processing circuitry to: receive a non-ICN packet from a radio bearer in a radio access network (RAN) interface, the non-ICN packet including QoS characteristics or a QoS identifier in a Service Data Adaption Protocol (SDAP) header, as defined in a family of 3GPP standards; and create an ICN packet that includes the QoS characteristics or the QoS identifier.

In Example 12, the subject matter of Example 11, wherein the instructions further cause the processing circuitry to: parse the QoS characteristics or the QoS identifier from the ICN packet, the ICN packet destined for a node connected via the RAN; write the QoS characteristics or the QoS identifier to a SDAP header of a new non-ICN packet; and transmit the new non-ICN packet via the RAN.

Example 13 is a method for quality-of-service (QoS) in a cellular information centric network (ICN), the method comprising: obtaining QoS characteristics for an ICN packet; applying the QoS characteristics to the ICN packet; and transmitting the ICN packet in accordance with the QoS characteristics.

In Example 14, the subject matter of Example 13, wherein obtaining the QoS characteristics includes being configured via a control plane without regard to receipt of the ICN packet.

In Example 15, the subject matter of Example 14, wherein being configured via the control plane includes requesting the QoS characteristics from the control plane and receiving the QoS characteristics in response.

In Example 16, the subject matter of any of Examples 13-15, wherein obtaining the QoS characteristics includes reading the QoS characteristics from the ICN packet.

In Example 17, the subject matter of any of Examples 13-16, wherein obtaining the QoS characteristics includes: reading an ICN QoS identifier from the ICN packet; and retrieving the QoS characteristics from a local data store using the ICN QoS identifier.

In Example 18, the subject matter of any of Examples 13-17, wherein obtaining the QoS characteristics includes: reading a reflective tag from the ICN packet, wherein the ICN packet is a data packet; locating an interest corresponding to the data packet in a pending interest table (PIT); reading an ICN QoS identifier from the interest in the PIT; and retrieving the QoS characteristics from a local data store using the ICN QoS Identifier.

In Example 19, the subject matter of any of Examples 13-18, wherein applying the QoS characteristics to the ICN packet include: separating traffic into logical units called flows, each flow including respective transmission parameters based on the QoS characteristics; and classifying the ICN packet into a flow for transmission.

In Example 20, the subject matter of Example 19, wherein classifying the ICN packet into the flow includes applying a filter to the ICN packet.

In Example 21, the subject matter of Example 20, wherein the filter classifies ICN packets based on QoS rules.

In Example 22, the subject matter of any of Examples 13-21, wherein the QoS characteristics are at least one of priority, ICN packet type, packet delay budget, packet error rate, maximum data burst volume, averaging window, computation capability, or packet delay imposed by computation.

In Example 23, the subject matter of any of Examples 13-22, comprising: receiving a non-ICN packet from a radio bearer in a radio access network (RAN) interface, the non-ICN packet including QoS characteristics or a QoS identifier in a Service Data Adaption Protocol (SDAP) header, as defined in a family of 3GPP standards; and creating an ICN packet that includes the QoS characteristics or the QoS identifier.

In Example 24, the subject matter of Example 23, comprising: parsing the QoS characteristics or the QoS identifier from the ICN packet, the ICN packet destined for a node connected via the RAN; writing the QoS characteristics or the QoS identifier to a SDAP header of a new non-ICN packet; and transmitting the new non-ICN packet via the RAN.

Example 25 is at least one machine-readable medium including instructions to implement quality-of-service (QoS) in a cellular information centric network (ICN), the instructions, when executed by processing circuitry, cause the processing circuitry to perform operations comprising: obtaining QoS characteristics for an ICN packet; applying the QoS characteristics to the ICN packet; and transmitting the ICN packet in accordance with the QoS characteristics.

In Example 26, the subject matter of Example 25, wherein obtaining the QoS characteristics includes being configured via a control plane without regard to receipt of the ICN packet.

In Example 27, the subject matter of Example 26, wherein being configured via the control plane includes requesting the QoS characteristics from the control plane and receiving the QoS characteristics in response.

In Example 28, the subject matter of any of Examples 25-27, wherein obtaining the QoS characteristics includes reading the QoS characteristics from the ICN packet.

In Example 29, the subject matter of any of Examples 25-28, wherein obtaining the QoS characteristics includes: reading an ICN QoS identifier from the ICN packet; and retrieving the QoS characteristics from a local data store using the ICN QoS identifier.

In Example 30, the subject matter of any of Examples 25-29, wherein obtaining the QoS characteristics includes: reading a reflective tag from the ICN packet, wherein the ICN packet is a data packet; locating an interest corresponding to the data packet in a pending interest table (PIT); reading an ICN QoS identifier from the interest in the PIT; and retrieving the QoS characteristics from a local data store using the ICN QoS Identifier.

In Example 31, the subject matter of any of Examples 25-30, wherein applying the QoS characteristics to the ICN packet include: separating traffic into logical units called flows, each flow including respective transmission parameters based on the QoS characteristics; and classifying the ICN packet into a flow for transmission.

In Example 32, the subject matter of Example 31, wherein classifying the ICN packet into the flow includes applying a filter to the ICN packet.

In Example 33, the subject matter of Example 32, wherein the filter classifies ICN packets based on QoS rules.

In Example 34, the subject matter of any of Examples 25-33, wherein the QoS characteristics are at least one of priority, ICN packet type, packet delay budget, packet error rate, maximum data burst volume, averaging window, computation capability, or packet delay imposed by computation.

In Example 35, the subject matter of any of Examples 25-34, wherein the operations comprise: receiving a non-ICN packet from a radio bearer in a radio access network (RAN) interface, the non-ICN packet including QoS characteristics or a QoS identifier in a Service Data Adaption Protocol (SDAP) header, as defined in a family of 3GPP standards; and creating an ICN packet that includes the QoS characteristics or the QoS identifier.

In Example 36, the subject matter of Example 35, wherein the operations comprise: parsing the QoS characteristics or the QoS identifier from the ICN packet, the ICN packet destined for a node connected via the RAN; writing the QoS characteristics or the QoS identifier to a SDAP header of a new non-ICN packet; and transmitting the new non-ICN packet via the RAN.

Example 37 is a device for quality-of-service (QoS) in a cellular information centric network (ICN), the device comprising: means for obtaining QoS characteristics for an ICN packet; means for applying the QoS characteristics to the ICN packet; and means for transmitting the ICN packet in accordance with the QoS characteristics.

In Example 38, the subject matter of Example 37, wherein the means for obtaining the QoS characteristics include means for being configured via a control plane without regard to receipt of the ICN packet.

In Example 39, the subject matter of Example 38, wherein the means for being configured via the control plane include means for requesting the QoS characteristics from the control plane and receiving the QoS characteristics in response.

In Example 40, the subject matter of any of Examples 37-39, wherein the means for obtaining the QoS characteristics include means for reading the QoS characteristics from the ICN packet.

In Example 41, the subject matter of any of Examples 37-40, wherein the means for obtaining the QoS characteristics include: means for reading an ICN QoS identifier from the ICN packet; and means for retrieving the QoS characteristics from a local data store using the ICN QoS identifier.

In Example 42, the subject matter of any of Examples 37-41, wherein the means for obtaining the QoS characteristics include: means for reading a reflective tag from the ICN packet, wherein the ICN packet is a data packet; means for locating an interest corresponding to the data packet in a pending interest table (PIT); means for reading an ICN QoS identifier from the interest in the PIT; and means for retrieving the QoS characteristics from a local data store using the ICN QoS Identifier.

In Example 43, the subject matter of any of Examples 37-42, wherein the means for applying the QoS characteristics to the ICN packet include: means for separating traffic into logical units called flows, each flow including respective transmission parameters based on the QoS characteristics; and means for classifying the ICN packet into a flow for transmission.

In Example 44, the subject matter of Example 43, wherein the means for classifying the ICN packet into the flow include means for applying a filter to the ICN packet.

In Example 45, the subject matter of Example 44, wherein the filter classifies ICN packets based on QoS rules.

In Example 46, the subject matter of any of Examples 37-45, wherein the QoS characteristics are at least one of priority, ICN packet type, packet delay budget, packet error rate, maximum data burst volume, averaging window, computation capability, or packet delay imposed by computation.

In Example 47, the subject matter of any of Examples 37-46, comprising: means for receiving a non-ICN packet from a radio bearer in a radio access network (RAN) interface, the non-ICN packet including QoS characteristics or a QoS identifier in a Service Data Adaption Protocol (SDAP) header, as defined in a family of 3GPP standards; and means for creating an ICN packet that includes the QoS characteristics or the QoS identifier.

In Example 48, the subject matter of Example 47, comprising: means for parsing the QoS characteristics or the QoS identifier from the ICN packet, the ICN packet destined for a node connected via the RAN; means for writing the QoS characteristics or the QoS identifier to a SDAP header of a new non-ICN packet; and means for transmitting the new non-ICN packet via the RAN.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus comprising:
   at least one memory;
   instructions; and
   processor circuitry to execute the instructions to at least:
      parse a reflective tag from a first information centric network (ICN) packet;
      obtain a quality-of-service (QoS) identifier based on an association of the reflective tag and an interest in a pending interest table;
      allocate the first ICN packet to a queue associated with QoS characteristics corresponding to the QoS identifier; and
      transmit the first ICN packet based on the QoS characteristics.

2. The apparatus of claim 1, wherein the processor circuitry is to:
   locate the interest in the pending interest table;
   read the QoS identifier from the interest in the pending interest table; and
   retrieve the QoS characteristics from a data store using the QoS identifier.

3. The apparatus of claim 1, wherein the QoS identifier is a first QoS identifier, and the processor circuitry is to:
   receive a non-ICN packet from a radio bearer in a radio access network interface, the non-ICN packet including a second QoS identifier in a Service Data Adaption Protocol (SDAP) header; and
   generate a second ICN packet based on the non-ICN packet, the second ICN packet including the second QoS identifier.

4. The apparatus of claim 3, wherein at least one of the radio access network interface or the SDAP header is based on one or more 3GPP standards.

5. The apparatus of claim 1, wherein the QoS identifier is a first QoS identifier, and the processor circuitry is to:
   receive a second ICN packet from a radio bearer in a radio access network interface, the second ICN packet including a second QoS identifier;
   determine whether the second ICN packet is to be transmitted to a node associated with the radio access network interface;
   in response to determining that the second ICN packet is to be transmitted to the node, write the second QoS identifier to a Service Data Adaption Protocol (SDAP) header;
   generate a non-ICN packet based on at least one of the second ICN packet or the SDAP header; and
   transmit the non-ICN packet to the node via the radio access network interface.

6. The apparatus of claim 1, wherein the processor circuitry is to:
   separate data traffic into one or more flows, each of the one or more flows being a logical unit that includes respective transmission parameters based on the QoS characteristics; and
   classify the first ICN packet into one of the one or more flows based on the QoS characteristics.

7. The apparatus of claim 1, wherein the processor circuitry is to:
   receive a configuration from a control plane;

in response to receiving the first ICN packet, request the QoS characteristics from the control plane; and in response to receiving the QoS characteristics from the control plane, generate an association of the QoS characteristics, the first ICN packet, and the configuration.

8. The apparatus of claim 7, wherein the configuration includes at least one of a filter, a classification, or an operation.

9. At least one non-transitory machine readable medium comprising instructions that, when executed, cause at least one processor to at least:
extract a reflective tag from a first information centric network (ICN) packet;
receive a quality-of-service (QoS) identifier based on an association of the reflective tag and an interest in a pending interest table;
assign the first ICN packet to a queue associated with QoS characteristics corresponding to the QoS identifier; and
deliver the first ICN packet based on the QoS characteristics.

10. The at least one non-transitory machine readable medium of claim 9, wherein the instructions are to cause the at least one processor to:
identify the interest in the pending interest table;
extract the QoS identifier from the interest in the pending interest table; and
obtain the QoS characteristics from a data store using the QoS identifier.

11. The at least one non-transitory machine readable medium of claim 9, wherein the QoS identifier is a first QoS identifier, and the instructions are to cause the at least one processor to:
obtain a non-ICN packet from a radio bearer of a radio access network interface, the non-ICN packet including a second QoS identifier in a Service Data Adaption Protocol (SDAP) header; and
create a second ICN packet based on the non-ICN packet, the second ICN packet including the second QoS identifier.

12. The at least one non-transitory machine readable medium of claim 9, wherein the QoS identifier is a first QoS identifier, and the instructions are to cause the at least one processor to:
receive a second ICN packet from a radio bearer in a radio access network interface, the second ICN packet including a second QoS identifier;
in response to a determination that the second ICN packet is to be transmitted to a node associated with the radio access network interface, embed the second QoS identifier in a Service Data Adaption Protocol (SDAP) header;
generate a non-ICN packet based on at least one of the second ICN packet or the SDAP header; and
provide the non-ICN packet to the node via the radio access network interface.

13. The at least one non-transitory machine readable medium of claim 9, wherein the instructions are to cause the at least one processor to:
split data traffic into one or more flows, each of the one or more flows being a logical unit that includes respective transmission parameters based on the QoS characteristics; and
associate the first ICN packet with one of the one or more flows based on the QoS characteristics.

14. The at least one non-transitory machine readable medium of claim 9, wherein the instructions are to cause the at least one processor to:
receive a configuration from a control plane;
in response to receiving the first ICN packet, generate a request for the QoS characteristics from the control plane; and
in response to receiving the QoS characteristics from the control plane, create an association of the QoS characteristics, the first ICN packet, and the configuration.

15. A method comprising:
identifying a reflective tag in a first information centric network (ICN) packet;
obtaining a quality-of-service (QoS) identifier based on an association of the reflective tag and an interest in a pending interest table;
assigning the first ICN packet to a queue associated with QoS characteristics corresponding to the QoS identifier; and
causing a transmission of the first ICN packet based on the QoS characteristics.

16. The method of claim 15, further including:
locating the interest in the pending interest table;
reading the QoS identifier from the interest in the pending interest table; and
extracting the QoS characteristics from a data store using the QoS identifier.

17. The method of claim 15, wherein the QoS identifier is a first QoS identifier, and further including:
receiving a non-ICN packet from a radio bearer in a radio access network interface, the non-ICN packet including a second QoS identifier in a Service Data Adaption Protocol (SDAP) header; and
producing a second ICN packet based on the non-ICN packet, the second ICN packet including the second QoS identifier.

18. The method of claim 15, wherein the QoS identifier is a first QoS identifier, and further including:
receiving a second ICN packet from a radio bearer in a radio access network interface, the second ICN packet including a second QoS identifier;
determining whether the second ICN packet is to be transmitted to a node associated with the radio access network interface;
in response to determining that the second ICN packet is to be transmitted to the node, writing the second QoS identifier to a Service Data Adaption Protocol (SDAP) header;
generating a non-ICN packet based on at least one of the second ICN packet or the SDAP header; and
delivering the non-ICN packet to the node via the radio access network interface.

19. The method of claim 15, further including:
dividing data traffic into one or more flows, each of the one or more flows being a logical unit that includes respective transmission parameters based on the QoS characteristics; and
determining a classification of the first ICN packet associated with the one or more flows based on the QoS characteristics.

20. The method of claim 15, further including:
receiving a configuration from a control plane;
in response to receiving the first ICN packet, requesting the QoS characteristics from the control plane; and in response to receiving the QoS characteristics from the control plane, storing an association of the QoS characteristics, the first ICN packet, and the configuration.

* * * * *